United States Patent
Lin et al.

(10) Patent No.: US 8,967,173 B2
(45) Date of Patent: Mar. 3, 2015

(54) SYSTEM AND METHODS FOR GROUND-BASED CABIN/CARGO PRESSURIZATION/DEPRESSURIZATION

(75) Inventors: Chao-Hsin Lin, Redmond, WA (US); Raymond H. Horstman, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 764 days.

(21) Appl. No.: 13/217,203

(22) Filed: Aug. 24, 2011

(65) Prior Publication Data
US 2013/0052615 A1    Feb. 28, 2013

(51) Int. Cl.
F17D 3/00 (2006.01)
B64F 5/00 (2006.01)

(52) U.S. Cl.
CPC .............. *B64F 5/0045* (2013.01); *Y02T 50/90* (2013.01)
USPC ............. 137/1; 137/154; 73/118.03; 434/126

(58) Field of Classification Search
USPC .............................. 137/154, 156–159, 169, 1; 417/105–107, 152; 73/118.03
See application file for complete search history.

(56) References Cited

U.S. PATENT DOCUMENTS

| | | | | |
|---|---|---|---|---|
| 141,762 A * | 8/1873 | Chase | ............................ | 417/105 |
| 142,333 A * | 9/1873 | Gibbons | ....................... | 417/105 |
| 1,405,821 A * | 2/1922 | Ehrhart | ......................... | 165/293 |
| 1,449,315 A * | 3/1923 | Christensen | ................... | 417/105 |
| 2,171,698 A * | 9/1939 | Hetzer | ........................... | 137/493 |
| 2,343,464 A * | 3/1944 | Lienau et al. | .............. | 137/492.5 |
| 3,703,809 A * | 11/1972 | Cassidy | ......................... | 165/110 |
| 3,858,844 A * | 1/1975 | Lewis et al. | ..................... | 251/28 |
| 4,742,760 A * | 5/1988 | Horstman et al. | .............. | 454/76 |
| 5,653,250 A * | 8/1997 | Sigmund et al. | .............. | 137/154 |
| 6,279,593 B1 * | 8/2001 | Sheppard | .......................... | 137/1 |
| 7,258,835 B2 * | 8/2007 | Wagner | ........................... | 422/26 |
| 7,655,077 B2 * | 2/2010 | Fielding | ......................... | 96/109 |
| 8,109,289 B2 * | 2/2012 | Trnka et al. | .............. | 137/487.5 |

OTHER PUBLICATIONS

Internet website: "http://www.begellhouse.com/references/IHTC13,3bec42fb4bc82e89,16eaf4d10388e82c.html" accessed on Aug. 18, 2011.
Internet website: "http://www.pneumofore.com/technology/case-studies/vacuum-flight-simulation-airbus" accessed on Aug. 18, 2011.

* cited by examiner

*Primary Examiner* — Craig Schneider
*Assistant Examiner* — Craig J Price
(74) *Attorney, Agent, or Firm* — Ameh IP; Lowell Campbell; Elahe Toosi (57) ABSTRACT

A system and methods for reducing pressure in an enclosed volume is disclosed. A first quantity of steam is inserted into a condensation chamber, and the first quantity of steam is substantially condensed in the condensation chamber. A first quantity of air is extracted from an enclosed volume into the condensation chamber.

20 Claims, 5 Drawing Sheets

SYSTEM AND METHODS FOR GROUND-BASED CABIN/CARGO PRESSURIZATION/DEPRESSURIZATION

FIELD

Embodiments of the present disclosure relate generally to fluid pressure simulation in enclosed volumes. More particularly, embodiments of the present disclosure relate to ground-based pressure chambers that simulate cabin or cargo pressurization/depressurization cycles during operation conditions.

BACKGROUND

Cabin pressure during cruise for some airplanes may be, for example but without limitation, 6000 ft. or 8000 ft. above sea level. For a new airplane program, a ground-based mock-up of a section of a cabin may be built to test, design and optimize, for example, air diffusers even though air density at sea level is substantially different from that in an altitude at 6000 ft, 8000 ft, or 10000 ft. An effect of ambient pressure on air flow patterns in cabins and cargo holds are significant. Therefore, optimized in-cabin air flow pattern based on the ground-based mock-up tests may not perform the same as in flight testing during a cruise stage.

An altitude chamber for testing some aircraft may be too small to accommodate a full-scale cabin mock-up, and thus cannot be adequately applicable to a small scale cabin model with scaled down air diffusers. For these aircraft, a database needs to be built for high altitude/depressurized conditions to obtain Federal Aviation Administration (FAA) certification. Due to lack of such a data set, one may need to compromise accuracy of engineering analysis particularly by using likely unrealistic ground data to extrapolate for airplanes at high altitude conditions. It is very costly to have an altitude chamber which can be used for a section of a full scale cabin or cargo compartment mock-up due to energy consumption for such a facility. There are currently only a few such facilities in the world.

SUMMARY

A system and methods for reducing pressure in an enclosed volume such as a pressure chamber are disclosed. A first quantity of steam is inserted into a condensation chamber expelling any air present within the condensation chamber, and the first quantity of steam is substantially condensed in the condensation chamber. A first quantity of air is extracted from an enclosed volume into the condensation chamber.

In this manner, embodiments of disclosure provide a design of a full-scale ground-based environmentally friendly and low-energy consumption altitude (pressurization/depressurization) chamber for cabin environment control system evaluation and material testing under realistic flight conditions. Thereby, providing significant cost savings on energy consumption, and facility maintenance, since it is much easier to run a steam plant than to maintain a vacuum chamber facility with large compressors.

In an embodiment, a method for reducing pressure in an enclosed volume inserts a first quantity of steam into a condensation chamber. The method further condenses substantially the first quantity of steam in the condensation chamber, and extracts a first quantity of air from an enclosed volume into the condensation chamber.

In another embodiment, a pressure simulation system comprises a condensation chamber, a condenser, and an airflow valve. The condensation chamber is operable to receive a first quantity of steam, and a condenser is operable to condense the first quantity of steam such that a vapor-to-liquid phase change reduces a pressure in the condensation chamber to provide a reduced pressure. The airflow valve is operable to open in response to the reduced pressure such that air flows into the condensation chamber.

In yet another embodiment, a method for simulating pressure differentials using a pressure simulator pressurizes an enclosed volume to a desired pressurization. The method further reduces a pressure in a condensation chamber by condensing a vapor into a liquid, and depressurizes the enclosed volume to a desired depressurization by extracting air from the enclosed volume into the condensation chamber.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to pressure simulation techniques, steam plants, pressure regulators, ducting systems, and other functional aspects of the systems (and the individual operating components of the systems)

may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, an aircraft cabin/cargo pressure simulation chamber. Embodiments of the disclosure, however, are not limited to such aircraft cabin/cargo applications, and the techniques described herein may also be utilized in other applications. For example but without limitation, embodiments may be applicable to a train tunnel pressure chamber, a pressure simulation chamber, simulation of truck cargo pressure, bus cabin/cargo pressure, simulation of train cabin/cargo pressure, simulation of ship cabin/cargo pressure, simulation of submarine cabin/cargo pressure chamber, a spacecraft cabin, and a spacecraft cargo hold.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Existing systems used to test altitudes experienced by an aircraft are expensive to operate and typically are noisy due to a means used to extract air from a pressure chamber. Also it is very costly to have an altitude chamber which can be used for a section of a full scale cabin mock-up due to the energy consumption for such a facility.

Embodiments of the disclosure solve this problem by extracting air from an enclosed volume by cooling a vapor. Thereby providing a ground-based test facility which is able to conduct realistic testing for airplane fire/smoke protection and cabin environment under low pressure conditions.

In addition, embodiments of the disclosure provide an accurate, low-cost, full-scale, energy-saving, and environmental friendly test facility to develop/optimize the air distribution system under the realistic cabin pressurization/depressurization cycles during flights and to study the effect of altitude on human thermal comfort and other factors that may affect the health and well-being of the flying passengers and crew as well as enhance safety.

For an even wider application, the cabin pressurization/depressurization facility described herein can be used in high speed rail development around the world. The current world record of speed for high speed train is about 450 km/hr. Increasing a top speed to 1000 km/hr has been considered, however, drag and noise from pressure changes from entering and exiting tunnels may require mitigation. Therefore, testing and/or operating a high speed train in an enclosed tunnel under lower pressure (e.g., to reduce drag and noise of the high speed train) would enable more efficient operation. A technology for depressurizing an enclosed tunnel with low energy consumption may be useful. Embodiments of the disclosure provide viable means for testing and/or operating such high speed trains and other vehicles in an enclosed tunnel.

Further, embodiments of disclosure provide accurate, low-cost, full-scale, energy-saving, and environmental friendly test facility to develop/optimize the air distribution system for commercial/military aircraft under the realistic cabin pressurization/depressurization cycles during flights and to study the effect of altitude on human thermal comfort and other factors that may affect the health and well-being of the flying passengers and crew.

As mentioned above, existing methods are generally energy-consuming, noisy, and moderate to high maintenance cost, difficulty to scale up without large capital investment. Unlike the existing method, which vacuums the air to achieve a depressurization in an enclosed environment, embodiments of the disclosure apply phase change to produce realistic pressurization/depressurization cycles similar to that of a real flight profile of commercial aircraft.

Embodiments of the disclosure apply an application of heat transfer of phase change to control the pressure changes in an enclosed volume on ground-level to realistically simulate an altitude effect of pressure in cabins. Unlike, existing solutions, a working fluid may be air and water which are environmentally friendly and recyclable.

Figure 1:
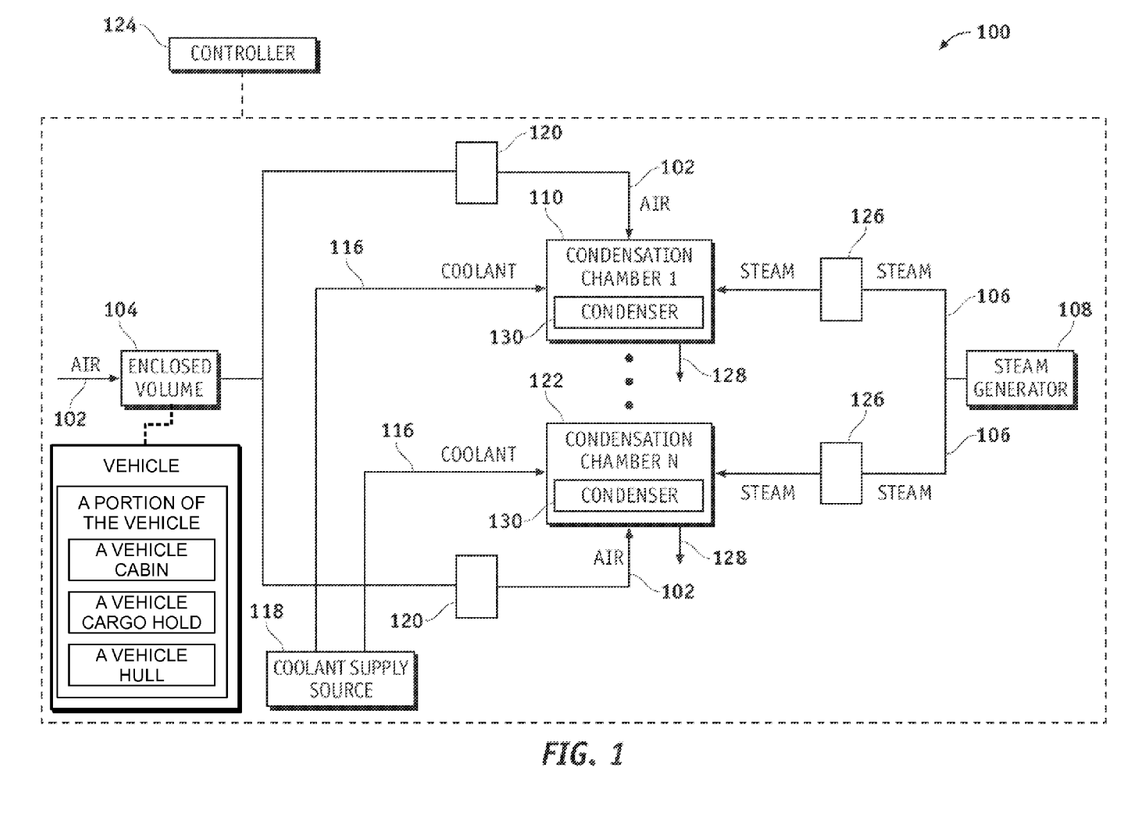
FIG. 1 is an illustration of an exemplary functional block diagram of a ground-based cabin pressurization/depressurization system according to an embodiment of the disclosure.

FIG. 1 is an illustration of an exemplary functional block diagram of a ground-based cabin pressurization/depressurization system 100 (system 100) according to an embodiment of the disclosure. The system 100 may comprise, an enclosed volume 104, a steam generator 108, a plurality of condensation chambers 110 to 122 comprising a plurality of condensers 130 (e.g., a heat exchanger), a coolant supply source 118, an airflow valve 120 (e.g., an air solenoid valve), a steam valve 126 (e.g., a solenoid valve), and a controller 124. The enclosed volume 104 may comprise, for example but without limitation, a pressure chamber.

Air 102 enters the enclosed volume 104 at a reference air pressure. The reference air pressure may comprise, for example but without limitation, a ground level reference air pressure, a simulated take-off altitude air pressure, and a simulated initial flight altitude air pressure. The reference air pressure may be provided by, for example but without limitation, pumping air, and regulating a local altitude pressure. Pumping air may be necessary if the local altitude pressure is lower than a desired reference pressure.

Saturated steam 106 (steam 106) from the steam generator 108 enters a plurality of condensation chambers 110 to 122 at a rate that matches an airflow requirement of the air 102. The steam valve 126 is opened to allow the steam 106 to flow into one or more of the condensation chambers 110 to 122. The condensation chambers 110 to 122 may comprise, for example, condensation chambers 1-N, where N is an integer. The number N can be any number greater than or equal to one. The number N may be chosen based on, for example but without limitation, a flow rate control, a condensation chamber cost, and an energy use (e.g., few large chambers may use less energy).

The condensers 130 reduce a temperature in the condensation chambers 110 and 122 by condensing the saturated steam 106 into water. For example but without limitation, the temperature in the condensation chambers 110 and 122 may be reduced from about 100° C. to about 50° C., and from about 95.5° C. to about 40° C. In this example, changing the steam 106 to water reduces a pressure inside the condensation chamber 110 and/or the condensation chamber 122 to a lower pressure than that in the enclosed volume 104 such that the air 102 can flow into the condensation chamber 110 and/or the condensation chamber 122. The condensers 130 in the condensation chambers 110 to 122 (condensation chambers 1-N) may comprise, for example but without limitation, a heat exchanger, a liquid nitrogen coolant received from a coolant supply source 118, and a cold water spray received from the coolant supply source 118.

The controller 124 detects the lower pressure in the condensation chamber 110 and/or the condensation chamber 122 and opens an airflow valve 120 accordingly to allow the air 102 to flow to the condensation chamber 110 and/or various combinations of the condensation chamber 110 through the condensation chamber 122, thereby depressurizing the enclosed volume 104 to a desired pressure.

In one embodiment, the air 102 flows alternately into the condensation chambers 110 through 122. For example, the condensation chamber 110 begins to be filed with the steam 106, while the condensation chamber 122 is already filled with the steam 106 and begins to receive the air 102. Once the condensation chamber 122 is filled with the air 102, the respective airflow valve 120 shuts off. By then, the condensation chamber 110 is filled by the steam 106 and begins to receive the air 102. Excess steam, air and or water may exit from at least one outlet such as an outlet 128 to stabilize possible pressure fluctuations in the condensation chambers 110 and 122.

Alternately flowing the air 102 between the condensation chambers 110 through 122 repeats until a desired depressurization is obtained in the enclosed volume 104.

The enclosed volume 104 may be pressurized via, for example but without limitation, an air pump (not shown), a regulated flow from a local air pressure, and a bottled air pressure. In this manner, a depressurization/pressurization cycle that emulates the in-cabin pressure variation during a flight's climbing-cruising-descending profile is simulated. The enclosed volume 104 may comprise, for example but without limitation, a truck cargo pressure chamber, a bus cabin/cargo pressure chamber, a train cabin/cargo pressure chamber, a ship cabin/cargo pressure chamber, a submarine cabin/cargo pressure chamber, and a train tunnel pressure chamber.

Figure 2:
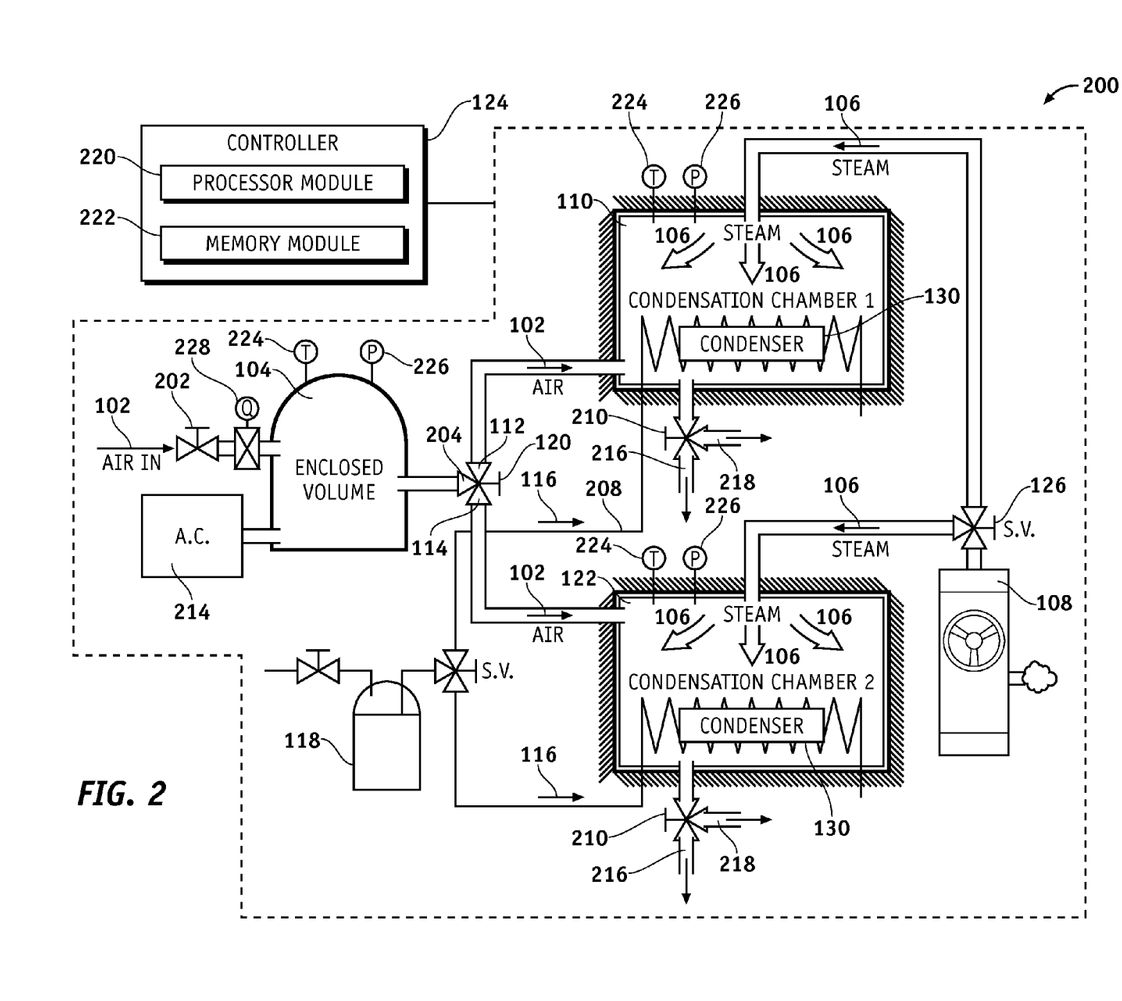
FIG. 2 is an illustration of an exemplary pressure simulation system showing the system in FIG. 1 in more detail according to an embodiment of the disclosure.

FIG. 2 is an illustration of an exemplary pressure simulation system 200 (system 200) showing the system 100 in more detail according to an embodiment of the disclosure. The system 200 may comprise the enclosed volume 104, the steam generator 108, the condensation chambers 110 and 122, the condensers 130, the coolant supply source 118, the airflow valve 120, the steam valve 126, a plurality of thermometers T 224, a plurality of pressure meters P 226, and a plurality of flow rate meters Q 228. The system 200 may have functions, material, and structures that are similar to the system 100. Therefore common features, functions, and elements may not be redundantly described here.

The enclosed volume 104 is coupled to an input valve 202 and the airflow valve 120. The airflow valve 120 comprises a pressure chamber output valve 204, a first airflow valve 112, and a second airflow valve 114. The enclosed volume 104 draws the air 102 when the input valve 202 is opened. The air 102 is then pulled out or released from the enclosed volume 104 into the airflow valve 120 to provide a reduced pressure in the enclosed volume 104. The air 102 then flows alternately through respective air duct 206 and the air duct 216 to the condensation chambers 110 and 122 when the first airflow valve 112 and a second airflow valve 114 are open respectively. The enclosed volume 104 then contains a reduced air pressure that has its pressure reduced from the reference air pressure. An air conditioning means 214 may be coupled to the enclosed volume 104 to reduce a temperature of the air 102 therein.

The airflow valve 120 between the enclosed volume 104 and the condensation chambers 110 and 122, opens the first airflow valve 112, and the second airflow valve 114 to allow the air 102 in the enclosed volume 104 to be drawn alternately into the condensation chambers 110 to 122 respectively based on respective pressure in the condensation chambers 110 and 122.

In this manner, the steam valve 126 closes to block a first steam flow of a first quantity of the steam 106 into the condensation chamber 110. The first airflow valve 112 then opens to allow an airflow of a first quantity of the air 102 from the enclosed volume 104 into the condensation chamber 110. The first airflow valve 112 then closes to block the flow of the air 102 from the enclosed volume 104 into the condensation chamber 110. The steam valve 126 then opens to allow a second steam flow of a second quantity of the steam 106 into the condensation chamber 122. Additional airflow valves 120 comprising the first airflow valve 112, and the second airflow valve 114 may be coupled to the enclosed volume 104 to open such that the air 102 flows from the enclosed volume 104 into additional condensation chambers respectively.

The steam valve 126 is coupled to the condensation chambers 110 and 122 and is operable to regulate a quantity of the steam 106 received by the condensation chambers 110 and 122. The steam valve 126 controls flow of the steam 106 to the condensation chambers 110 and 122 alternately.

Each of the condensation chambers 110 to 122 is operable to receive the steam 106 and extract the air 102 from the enclosed volume 104 alternately. In operation, the condensation chamber 110 may begin to be filed with the steam 106, while the condensation chamber 122 is already filled with a first quality of the steam 106. The condensation chamber 122 begins to substantially condense the first quantity of the steam 106 in the condensation chamber 122, and extracts the first quantity of the air 102 from the enclosed volume 104 into the condensation chamber 122. Once the condensation chamber 122 is filled with the first quantity of the air 102, the second airflow valve 114 shuts off. The condensation chamber 110 is filled by the second quantity of the steam 106 and begins to receive the second quantity of the air 102. In this manner, the flow of the air 102 is alternated between the condensation chamber 110 and the condensation chamber 122 until a desired depressurization is obtained in the enclosed volume 104.

Additional quantities of the steam 106 can be inserted into additional condensation chambers respectively and be substantially condensed in each of the additional condensation chambers respectively. In this manner, additional quantity of the air 102 from the enclosed volume 104 can be extracted into the additional condensation chambers respectively. Thus, the air 102 can be alternated between the additional condensation chambers until a desired depressurization is obtained in the enclosed volume 104.

Excess water and steam/air may exit from a water outlet 216 and a steam/air outlet 218 respectively to stabilize possible pressure fluctuations in the condensation chambers 110 through 122. For example, the first quantity of the air 102 from the condensation chamber 110 is substantially expelled from the steam/air outlet 218 during the second steam flow.

The condensers 130 are operable to condense the steam 106 such that a vapor-to-liquid phase change reduces a pressure in the condensation chambers 110 and 122. Additional condensers 130 may be used to condense additional quantity of the steam 106 such that a vapor-to-liquid phase change reduces a pressure in the additional condensation chambers. The embodiment in FIG. 2 shows two condensation chambers 110 and 122, but any number of additional condensation chambers may be used to obtain the required pressure in the enclosed volume 104.

The steam generator 108 generates the steam 106 at temperatures such as, for example but without limitation, about 100° C. and about 95.5° C. (e.g., at about 1400 m).

The coolant supply source 118 provides the coolant 116 through a coolant duct 208 to each of the condensers 130 in the condensation chambers 110 and 122. The steam 106 is then cooled down by the condensers 130. The coolant 116 may comprise, for example but without limitation, liquid nitrogen from a liquid nitrogen source as illustrated in FIG. 2, and a cold water spray.

The controller 124 comprises a processor module 220, and a memory module 222. The controller 124 is operable to control the airflow valves 120 between the enclosed volume 104 and the condensation chambers 110 and 122, to allow the air 102 in the enclosed volume 104 be drawn to the condensation chambers 110 and 122 alternately. When the condensation chamber 110 begins to be filed with the steam 106, the controller 124 detects a high pressure in the condensation chamber 110 and opens the second airflow valve 114 such that the air 102 can begin flowing to the condensation chamber 122 which is already filled with the steam 106.

Once the condensation chamber 122 is filled with the air 102, the second airflow valve 114 shuts off. By then, the condensation chamber 110 is filled by the steam 106 and the controller 124 detects a low pressure in the condensation chamber 110 and opens the first airflow valve 112 such that the air 102 can begin flowing to the condensation chamber 110 which is now filled with the steam 106. In this manner, the condensation chambers 110 and 122 alternately receive the air 102 until the required pressure in the enclosed volume 104 is obtained.

The processor module 220 comprises processing logic that is configured to carry out the functions, techniques, and processing tasks associated with the operation of the systems 100-200. In particular, the processing logic is configured to support the systems 100-200 described herein. For example, the processor module 220 may direct the steam valve 126 to alternate the flow of the steam 106 from the steam generator 108 to the condensation chambers 110 to 122 based on a pressure in the enclosed volume 104. For another example the processor module 220 may direct the first airflow valve 112 and the second airflow valve 114 of the airflow valve 120 to alternate flow of the air 102 between the condensation chambers 110 and 122 based on the pressure in the condensation chambers 110 and 122.

The processor module 220 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 222 may comprise a data storage area with memory formatted to support the operation of the systems 100-200. The memory module 222 is configured to store, maintain, and provide data as needed to support the functionality of the system 100-200. For example, the memory module 222 may store a database, a temperature database, a temperature altitude database, an operational control data, and flight configuration data.

In practical embodiments, the memory module 222 may comprise, for example but without limitation, a non-volatile storage device (non-volatile semiconductor memory, hard disk device, optical disk device), a random access storage device (for example, SRAM, DRAM), or any other form of storage medium known in the art.

The memory module 222 may be coupled to the processor module 220 and configured to store, for example but without limitation, a database, a temperature database, a temperature altitude database, an operational control data, and flight configuration data. Additionally, the memory module 222 may represent a dynamically updating database containing a table for updating the database, and the like. The memory module 222 may also store, a computer program that is executed by the processor module 220, an operating system, an application program, tentative data used in executing a program, and the like.

The memory module 222 may be coupled to the processor module 220 such that the processor module 220 can read information from and write information to the memory module 222. For example, the processor module 220 may access the memory module 222 to access the aircraft speed, flight control surface positions, an angle of attack, a Mach number, and an altitude.

As an example, the processor module 220 and memory module 222 may reside in respective application specific integrated circuits (ASICs). The memory module 222 may also be integrated into the processor module 220. In an embodiment, the memory module 222 may comprise a cache memory for storing temporary variables or other intermediate information during execution of instructions to be executed by the processor module 220.

Figure 3:
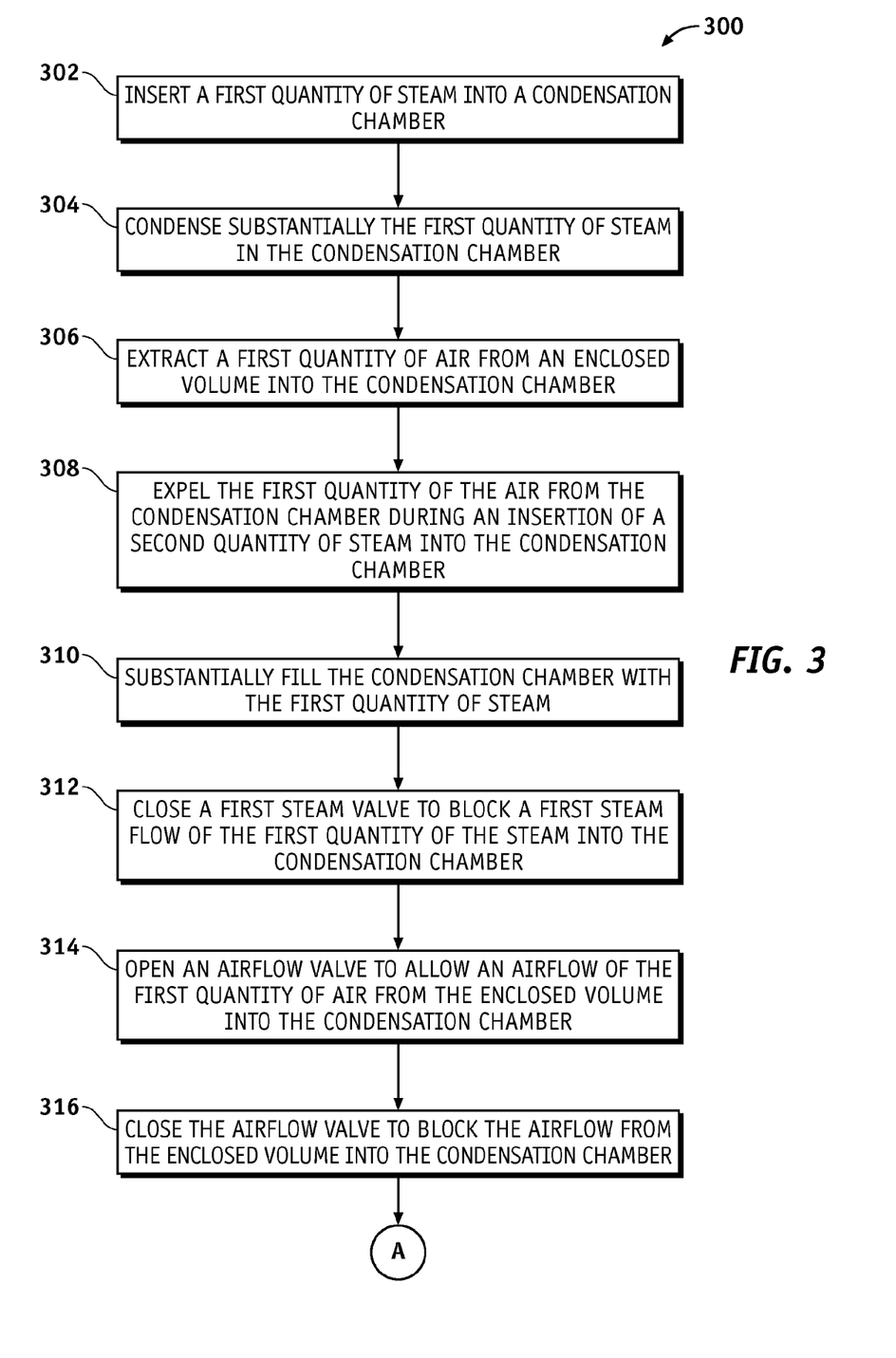
FIG. 3 is an illustration of an exemplary flowchart showing an enclosed volume pressure reduction process according to an embodiment of the disclosure.

FIG. 3 is an illustration of an exemplary flowchart showing an enclosed volume pressure reduction process 300 according to an embodiment of the disclosure. The various tasks performed in connection with the process 300 may be performed mechanically, by software, hardware, firmware, a computer-readable medium having computer executable instructions for performing the processes methods, or any combination thereof. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein. For illustrative purposes, the following description of the process 300 may refer to elements mentioned above in connection with FIGS. 1-2.

In practical embodiments, portions of the process 300 may be performed by different elements of the systems 100-200 such as: the enclosed volume 104, the steam generator 108, the condensation chambers 110 to 122, the coolant supply source 118, the airflow valves 120, the steam valves 126, etc. Process 300 may have functions, material, and structures that are similar to the embodiments shown in FIGS. 1-2. Therefore, common features, functions, and elements may not be redundantly described here.

Process 300 may begin by inserting a first quantity of the steam 106 into a condensation chamber such as the condensation chamber 110 (task 302).

Process 300 may continue by condensing substantially the first quantity of the steam 106 in the condensation chamber 110 (task 304). The first quantity of the steam 106 may be cooled, for example but without limitation, from about 100° C. to about 50° C. Based on energy balance, a total enthalpy difference of the steam 106 at about 100° C. to that at about 50° C. can be obtained to determine an amount of the heat that needs to be removed.

Process 300 may then continue by extracting a first quantity of the air 102 from an enclosed volume such as the enclosed volume 104 into the condensation chamber 110

(task 306). In this manner, a second airflow valve such as the second airflow valve 114 opens to allow an airflow of the first quantity of the air 102 from the enclosed volume 104 into the condensation chamber 110.

Process 300 may then continue by substantially expelling the first quantity of the air 102 from the condensation chamber 110 during an insertion of a second quantity of the steam 106 into the condensation chamber 110 (task 308). Quantities of the steam 106 such as the first quantity of the steam 106 and the second quantity of the steam 106 are repeatedly inserted into the condensation chamber 110 and condensed by tasks 302 through 306.

Process 300 may then continue by substantially filling the condensation chamber 110 with the first quantity of the steam 106 (task 310).

Process 300 may then continue by closing a first steam valve such as the first steam valve 126 to block a first steam flow of the first quantity of the steam 106 into the condensation chamber 110 (task 312).

Process 300 may then continue by opening an airflow valve such as the first airflow valve 112 (FIG. 2) to allow an airflow of the first quantity of the air 102 from the enclosed volume 104 into the condensation chamber 110 (task 314).

Process 300 may then continue by closing the airflow valve 112 to block the airflow from the enclosed volume 104 into the condensation chamber 110 (task 316).

Process 300 may then continue by opening the first steam valve 126 to allow a second steam flow of a second quantity of the steam 106 into the condensation chamber 110 (task 318).

Process 300 may then continue by substantially expelling the first quantity of the air 102 from the condensation chamber 122 during the second steam flow (task 320).

Process 300 may then continue by inserting at least one additional quantity of the steam 106 into at least one additional condensation chamber such as the condensation chamber 122 (task 322).

Process 300 may then continue by substantially condensing the at least one additional quantity of the steam 106 into the additional condensation chamber 122 (task 324).

Process 300 may then continue by extracting at least one additional quantity of the air 102 from the enclosed volume 104 into the additional condensation chamber 122 (task 326).

Process 300 may then continue by extracting the air 102 from the enclosed volume 104 alternately into the condensation chamber 110 and into the additional condensation chamber 122 (task 328).

Process 300 may then continue by extracting the air 102 from the enclosed volume 104 until a desired pressure is reached in the enclosed volume 104 (task 330). In one embodiment, a volume of the enclosed volume 104 may be about 64 $m^3$, an equivalence of a 10-seat row section of a large passenger aircraft (e.g., Length=8 m, Width=4 m and Height=2 m).

Process 300 may then continue by extracting condensation water from the condensation chamber 110 (task 332).

Figure 4:
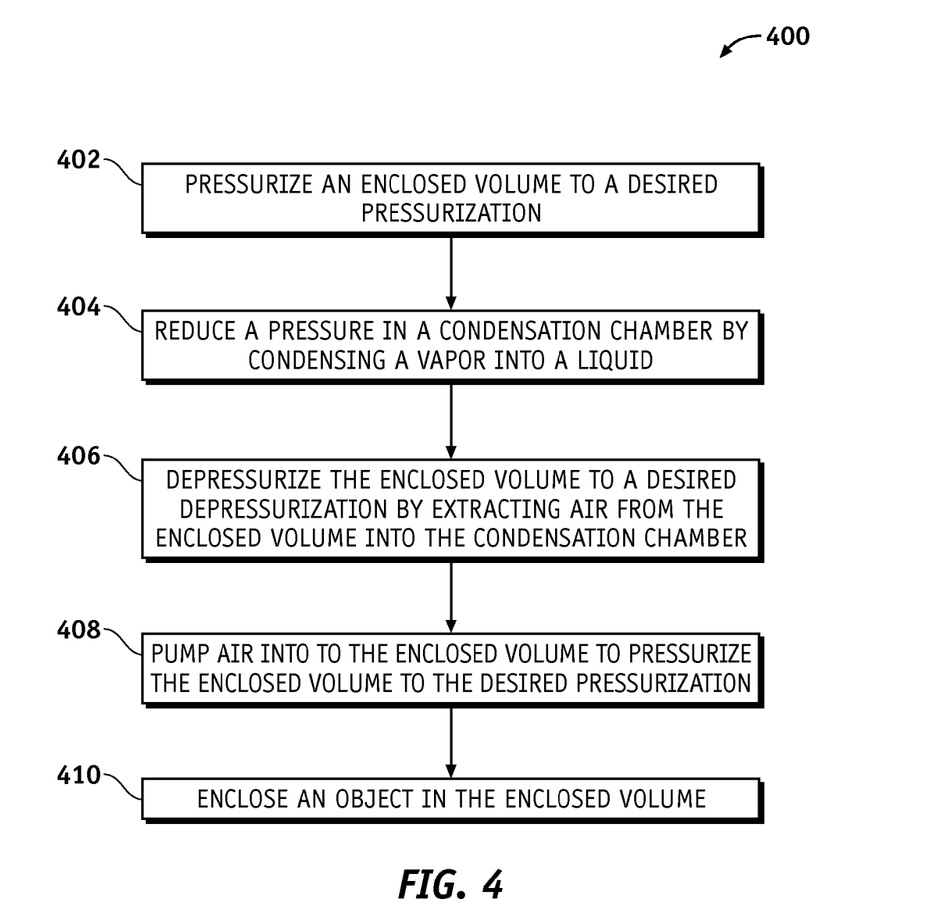
FIG. 4 is an illustration of an exemplary flowchart showing a ground-based cabin pressure simulation process according to an embodiment of the disclosure.

FIG. 4 is an illustration of an exemplary flowchart showing a ground-based cabin pressure simulation process 400 according to an embodiment of the disclosure. The various tasks performed in connection with process 400 may be performed mechanically, by software, hardware, firmware, a computer-readable medium having computer executable instructions for performing the processes methods, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein. For illustrative purposes, the following description of the process 400 may refer to elements mentioned above in connection with FIGS. 1-2.

In practical embodiments, portions of the process 400 may be performed by different elements of the systems 100-200 such as: the enclosed volume 104, the steam generator 108, the condensation chambers 110 to 122, the coolant supply source 118, the airflow valves 120, the steam valves 126, etc. Process 400 may have functions, material, and structures that are similar to the embodiments shown in FIGS. 1-2. Therefore common features, functions, and elements may not be redundantly described here.

Process 400 may begin by pressurizing an enclosed volume such as the enclosed volume 104 to a desired pressurization (task 402). The desired pressurization may simulate a pressure profile such as, for example but without limitation, an approach flight condition, a landing flight condition, a high speed train operation condition, and a vehicle operation condition. The desired pressurization may comprise, for example but without limitation, a ground level reference air pressure, a simulated take-off altitude air pressure, and a simulated initial flight altitude air pressure. The desired pressurization may be provided by, for example but without limitation, pumping air, and regulating a local altitude pressure. Pumping air may be necessary if the local altitude pressure is lower than the desired pressurization.

Process 400 may continue by reducing a pressure in a condensation chamber such as the condensation chamber 112 by condensing a vapor into a liquid (task 404).

Process 400 may continue by depressurizing the enclosed volume 104 to a desired depressurization by extracting air from the enclosed volume 104 into the condensation chamber 112 (task 406). The desired depressurization may simulate a pressure profile such as, for example but without limitation, a takeoff flight condition, and a cruise flight condition profile. The desired depressurization may comprise, for example but without limitation, a takeoff altitude air pressure, a simulated cruise altitude air pressure, and a simulated flight altitude air pressure.

Process 400 may then continue by pumping air to the enclosed volume 104 to pressurize the enclosed volume 104 to the desired pressurization (task 408).

Process 400 may then continue by enclosing an object in the enclosed volume 104 (task 410). The object may comprise, for example but without limitation, a vehicle, and a portion of the vehicle. The portion of the vehicle may comprise, for example but without limitation, a vehicle cabin, a vehicle cargo hold, a vehicle hull, such as an aircraft cabin, an aircraft cargo hold, a spacecraft cabin, a spacecraft cargo hold, a truck cargo box, a bus cabin, a bus cargo box, a train, a train cabin, a train cargo hold, a ship cabin, a ship cargo hold, and a submarine hull.

In this way, a vapor is converted to a liquid in an enclosed volume to induce extraction of air from another enclosed volume. In this manner, a ground-based cabin/cargo pressurization/depressurization system with reduced weight, complexity and cost, and increased accuracy is provided.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for reducing pressure in an enclosed volume, the method comprising:
   enclosing an object in an enclosed volume, wherein the object comprises a vehicle or a portion of the vehicle;
   inserting a first quantity of steam into a condensation chamber;
   condensing substantially the first quantity of steam in the condensation chamber; and
   extracting a first quantity of air from the enclosed volume into the condensation chamber.

2. The method of claim 1, further comprising substantially expelling the first quantity of air from the condensation chamber during an insertion of a second quantity of steam into the condensation chamber.

3. The method of claim 1, further comprising substantially filling the condensation chamber with the first quantity of steam.

4. The method of claim 1, further comprising:
   closing a first valve to block a first steam flow of the first quantity of steam into the condensation chamber; and
   opening a second valve to allow an airflow of the first quantity of air from the enclosed volume into the condensation chamber.

5. The method of claim 4, further comprising:
   closing the second valve to block the airflow from the enclosed volume into the condensation chamber;
   opening the first valve to allow a second steam flow of a second quantity of steam into the condensation chamber; and
   expelling substantially the first quantity of air from the condensation chamber during the second steam flow.

6. The method of claim 1, further comprising:
   inserting at least one additional quantity of steam into at least one additional condensation chamber;
   condensing substantially the at least one additional quantity of steam in the at least one additional condensation chamber; and
   extracting at least one additional quantity of air from the enclosed volume into the at least one additional condensation chamber.

7. The method of claim 6, further comprising extracting air from the enclosed volume alternately into the condensation chamber and into each at least one additional condensation chamber.

8. The method of claim 1, further comprising extracting air from the enclosed volume until a desired pressure is reached in the enclosed volume.

9. The method of claim 1, wherein the portion of the vehicle comprises at least one of: a vehicle cabin, a vehicle cargo hold, and a vehicle hull.

10. A pressure simulation system comprising:
    a condensation chamber operable to receive a first quantity of steam;
    a condenser operable to condense the first quantity of steam such that a vapor-to-liquid phase change reduces a pressure in the condensation chamber to provide a reduced pressure;
    an airflow valve operable to open in response to the reduced pressure such that air flows into the condensation chamber; and
    an enclosed volume coupled to the airflow valve and configured to enclose an object comprising a vehicle or a portion of the vehicle.

11. The pressure simulator of claim 10, further comprising a steam valve coupled to the condensation chamber and operable to regulate the first quantity of steam.

12. The pressure simulator of claim 10, wherein the enclosed volume is further configured to:
    release air into the airflow valve to provide a reduced air pressure in the enclosed volume; and
    contain the reduced air pressure, the reduced air pressure reduced from a reference air pressure.

13. The pressure simulator of claim 12, further comprising:
one or more additional condensation chambers each operable to receive at least one additional quantity of steam respectively;
one or more additional condensers each operable to condense the at least one additional quantity of steam such that a vapor-to-liquid phase change reduces a pressure in each of the additional condensation chambers respectively; and
one or more additional airflow valves coupled to the enclosed volume and each operable to open such that air flows from the enclosed volume into the one or more additional condensation chambers.

14. The pressure simulator of claim 13, wherein the airflow valve and at least one of the one or more additional airflow valves are operable to open alternately.

15. The pressure simulator of claim 13, further comprising a controller operable to control the airflow valve and at least one of the one or more additional airflow valves.

16. The pressure simulator of claim 10, wherein the condenser comprises at least one of: a heat exchanger, a liquid nitrogen coolant, and a cold water spray.

17. The system of claim 10, wherein the portion of the vehicle comprises at least one of: a vehicle cabin, a vehicle cargo hold, and a vehicle hull.

18. A method for simulating pressure differentials using a pressure simulator, the method comprising:
enclosing an object in an enclosed volume, wherein the object comprises a vehicle or a portion of the vehicle;
pressurizing the enclosed volume to a desired pressurization;
reducing a pressure in a condensation chamber by condensing a vapor into a liquid; and
depressurizing the enclosed volume to a desired depressurization by extracting air from the enclosed volume into the condensation chamber.

19. The method of claim 18, further comprising pumping air into the enclosed volume to pressurize the enclosed volume to the desired pressurization.

20. The method of claim 18, wherein the portion of the vehicle comprises at least one of: a vehicle cabin, a vehicle cargo hold, and a vehicle hull.

* * * * *